United States Patent [19]

Rau et al.

[11] Patent Number: 5,022,923

[45] Date of Patent: Jun. 11, 1991

[54] PEARL LUSTER PIGMENTS STABLE TO GLAZE AND ENAMEL

[75] Inventors: Axel Rau, Pfullendorf; Klaus Ambrosius, Frankfurt; Klaus D. Franz, Kelheim, all of Fed. Rep. of Germany

[73] Assignee: Merck Patent Gesellschaft Mit Beschrankter Haftung, Darmstadt, Fed. Rep. of Germany

[21] Appl. No.: 916,757

[22] Filed: Oct. 8, 1986

[51] Int. Cl.$^5$ .............................................. C04B 14/20
[52] U.S. Cl. .................... 106/415; 106/417; 106/436; 106/439; 106/441
[58] Field of Search .................. 106/291, 300, 308 B, 106/309

[56] References Cited

U.S. PATENT DOCUMENTS

| | | | |
|---|---|---|---|
| 4,038,099 | 7/1977 | DeLuca, Jr. et al. | 106/309 |
| 4,040,859 | 8/1977 | Esselborn et al. | 106/291 |
| 4,086,100 | 4/1978 | Esselborn et al. | 106/291 |
| 4,134,776 | 1/1979 | Rieger et al. | 106/291 |
| 4,192,691 | 3/1980 | Armanini | 106/291 |
| 4,344,987 | 8/1982 | Ostertag et al. | 106/291 |
| 4,494,993 | 1/1985 | Bernhard et al. | 106/309 |
| 4,552,593 | 11/1985 | Ostertag | 106/291 |
| 4,565,581 | 1/1986 | Bernhard | 106/291 |
| 4,623,396 | 11/1986 | Kimura et al. | 106/291 |

FOREIGN PATENT DOCUMENTS 1467468 12/1968 Fed. Rep. of Germany .
1359933 7/1974 United Kingdom .

*Primary Examiner*—William R. Dixon, Jr.
*Assistant Examiner*—Willie Thompson
*Attorney, Agent, or Firm*—Millen, White & Zelano

[57] ABSTRACT

Pearl luster pigments based on mica flakes coated with metal oxides are provided with a top coating of tin dioxide and/or cerium dioxide to improve their stability in glazes and enamels.

5 Claims, No Drawings

PEARL LUSTER PIGMENTS STABLE TO GLAZE AND ENAMEL

BACKGROUND OF THE INVENTION

The invention relates to pearl luster pigments which are based on mica flakes coated with metal oxides, in particular titanium dioxide, and have an improved stability in glazes and enamels.

The previously known metal oxide/mica pigments are in many cases annealed during their preparation at temperatures of up to 1,000° C. and are therefore to be regarded as extremely stable to heat. Nevertheless, these pigments usually cannot be used in decorative glazes or enamel, since under the stoving conditions of about 750°–850° C. customary here the pigments are so severely attacked by the aggressive enamels that the pearl luster effect is very greatly impaired. Only pigmenting of decorative enamels on glass, for which lower temperatures of about 500°–750° C. are used, has so far been successfully carried out.

There was therefore a need for pigments with which decorative pearl luster effects can also be produced in the glazes and enamels stoved at high temperatures.

SUMMARY OF THE INVENTION

It is an object of this invention to provide such coatings.

Upon further study of the specification and appended claims, further objects and advantages of this invention will become apparent to those skilled in the art.

It has now been found that the desired stabilization can be achieved by an additional coating with an outer layer of tin dioxide and/or cerium dioxide.

The invention therefore relates to pearl luster pigments based on mica flakes coated with metal oxides, in particular titanium dioxide, which are characterized in that the pigments have a covering layer of tin dioxide and/or cerium dioxide to achieve an improved stability in glazes and enamels.

The invention also relates to a process for the preparation of pearl luster pigments which are based on mica flakes coated with metal oxides, in particular titanium dioxide, and have an improved stability in glazes and enamels, which is characterized in that at least once a solution of a tin and/or cerium salt is added to an aqueous suspension of an annealed or non-annealed mica flake pigment coated with one or more metal oxides, the pH value of the suspension being kept largely constant, by simultaneous addition of a base, within a range which effects hydrolysis of the salt added, and the pigment coated in this manner with tin dioxide and/or cerium dioxide is separated off, washed, if appropriate, and dried, and is then calcined.

Finally, the invention also relates to the use of pearl luster pigments which are based on mica flakes coated with metal oxides and which have an outer coating of tin dioxide and/or cerium dioxide, for pigmenting glazes and enamels.

Pearl luster (pearlescent) pigments which are based on mica flakes coated with metal oxides and contain tin dioxide are known per se. German Patent Specification 2,214,545 thus reports that a titanium dioxide coating in the rutile modification can be obtained by a tin dioxide content, the tin dioxide concentration being highest immediately adjacent to the mica. A tin dioxide outer layer is neither suitable for rutilization of a titanium dioxide layer nor already described in this patent specification.

German Patent Specification 2,522,572 reports that $TiO_2$ and $SnO_2$ layers are alternately precipitated onto mica in order to achieve a titanium dioxide coating in the rutile form. A $TiO_2$ layer is expressly used here as the top coating. The knowledge that a top coating of tin dioxide or cerium dioxide is capable of improving the stability of these pearl luster pigments to glaze and enamel does not belong to the prior art.

Substantial amounts of these oxides must be applied in order to achieve the desired stabilization. It has thus proved to be advantageous to apply the protective coating in amounts of about 5–30% by weight, based on the total pigment. Amounts of about 10–20% by weight are preferred here. Amounts greater than 30% are possible per se, but are not appropriate for economic reasons. Incomplete stabilization is as a rule achieved with amounts of less than 5% by weight.

The additional coating is applied in a manner which is known per se, by hydrolytic precipitation of tin dioxide hydrate and/or cerium dioxide hydrate and subsequent dehydration and annealing to give the oxides. For this, an aqueous suspension of the pigment to be coated is made and the corresponding solution of tin salt and/or cerium salt is metered in at a pH value suitable for hydrolysis, the pH value as a rule being kept largely constant by simultaneous addition of a base. A pH value which is suitable for hydrolysis is as a rule about 1–7.

For coating with tin dioxide, it is possible to start either from tin(II) salts, such as, for example, $SnCl_2$ or $SnSO_4$, an oxidizing agent, such as, for example, $H_2O_2$ or $KClO_3$ simultaneously being added, or directly from tin(IV) salts, such as, for example, $SnCl_4$, $SnBr_4$ or $SnCl_4.5H_2O$. Cerium(IV) salts of the type $(NH_4)_2Ce(NO_3)_6$ or $Ce(SO_4)_2 \cdot 4H_2O$ are particularly suitable for coating with cerium dioxide. It is also possible for mixtures of various salts of one metal or mixtures of tin salts and cerium salts to be used here. The relative amounts of each are not critical, e.g., from 0–100% of either being useful. Layers of pure $SnO_2$ are preferably applied.

In the top layer of this invention, there typically are no other ingredients other than the tin and/or cerium oxides. However, a content of other oxides of up to about 10 wt % of the layer can be tolerated.

Mica pigments coated with titanium dioxide can be used, in particular, as the base materials which are stabilized by the additional coating. In addition, however, other metal oxides, such as, for example, $SnO_2$, $Al_2O_3$, $Fe_2O_3$ or $SiO_2$, can also be contained in the $TiO_2$ layer or as a discrete layer. Base pigments with $TiO_2$ in the rutile form are preferably employed.

The additional coating with $SnO_2$ and/or $CeO_2$ can be carried out immediately after precipitation of the titanium dioxide layer onto the base pigment, without the base pigment first being annealed. However, a base pigment which has already been annealed is preferably used.

It is furthermore possible to apply the additional coating in several stages, intermediate annealing in each case being carried out. This provides a further improvement in the stability, but is so expensive that it will be used only in exceptional cases. The annealing temperature is in each case the temperatures which are also otherwise customary, of about 700°–900° C.

The pigments additionally coated in this manner can in principle be employed for all the known applications, but because of their improved stability they are preferably used for pigmenting ceramic materials and surface coatings, such as glass, enamel, porcelain and all types of glazes. Use in top and decorative enamel and in decorative glazes is preferred.

The glaze and enamel compositions per se are entirely conventional. Suitable ingredients and relative amounts are thoroughly discussed in the prior art in references including Ullmanns Encyklopädie der technischen Chemie (Ullmann's encyclopaedia of technical chemistry), 4. edition, Vol. 10, pages 435–448, "Emails" by Josef Wratil, edited by Deutsche Borax Co. Ltd. and Werner Lehnhäuser: Glasuren und ihre Farben (glazes and their colors), Wilhelm Knapp Verlag 1983, which disclosures are entirely incorporated by reference herein.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the preceding text and the following examples, all temperatures are set forth uncorrected in degrees Celsius and all parts and percentages are by weight; unless otherwise indicated.

EXAMPLE 1

A solution of 14 g of $SnCl_4.5H_2O$ in 280 ml of dilute hydrochloric acid is metered at a rate of 2 ml/minute at a temperature of 75° C. and a pH value of 1.8 into a suspension, in 2,000 ml of water, of 100 g of a silver-white mica/titanium dioxide pigment in the rutile modification which has been prepared by the process of German Patent Specification 2,522,572 and has a particle size distribution of 10–100 μm, the pH value being kept constant by simultaneous dropwise addition of 30% sodium hydroxide solution. After the mixture has been subsequently stirred for half an hour, the pigment is allowed to settle and is then separated off, washed with water, dried at 120° C. and annealed at 800° C. for half an hour.

EXAMPLE 2

A solution of 16.7 g of $SnCl_2.2H_2O$ in 520 ml of dilute hydrochloric acid and a solution of 3.8 g of $KClO_3$ in 520 ml of water are simultaneously added at a rate of 2 ml/minute at 75° C. and at a pH value of 1.8 to a suspension, in 2,000 ml of water, of 100 g of a silver-white titanium dioxide/mica pigment in the rutile modification which has been prepared in accordance with German Patent Specification 2,522,572 and has a particle size distribution of 10–60 μm, the pH value being kept constant by dropwise addition of 30% sodium hydroxide solution. After the mixture has been subsequently stirred for half an hour, it is allowed to settle and is then separated off, washed with water, dried at 120° C. and annealed at 800° C. for half an hour.

EXAMPLE 3

In accordance with Example 1, 100 g of a silver-white titanium dioxide/mica pigment in the rutile modification which has been prepared in accordance with German Patent Specification 2,522,572 and has a particle size distribution of 10–60 μm is coated with tin dioxide, using 16.3 g of $SnCl_4.5H_2O$ in 330 ml of dilute hydrochloric acid, separated off, washed, dried and annealed.

The pigment thus obtained is suspended in water again and coated with a second layer of tin dioxide in the same manner.

EXAMPLE 4

Mica with a particle size distribution of 10–60 μm is coated with titanium dioxide in accordance with the process of German Patent Specification 2,522,572 and is separated off, washed and dried. Before calcining, 187 g of the silver-white pigment are suspended in 2,000 ml of water and coated with tin dioxide at 75° C. and at a pH of 1.8 by metering in a solution of 46.5 g of $SnCl_4.5H_2O$ in 465 ml of dilute hydrochloric acid. After the mixture has been subsequently stirred for half an hour, the pigment is allowed to settle and is then separated off, washed with water, dried at 120° C. and annealed at 800° C. for half an hour.

EXAMPLE 5

A 15% titanium tetrachloride solution is metered at a rate of 2 ml/minute at 75° C. and at a pH value of 2.1 into a suspension, in 2,000 ml of water, of 100 g of mica with a particle size distribution of 10–60 μm, the pH value being kept constant by dropwise addition of 30% sodium hydroxide solution. After a silver-white interference colour has been achieved, the mixture is subsequently stirred for a further half an hour and the pigment is then allowed to settle and is subsequently separated off, washed with water and dried at 120° C. A solution of 34.9 g of $SnCl_4.5H_2O$ in 350 ml of dilute hydrochloric acid is metered at a rate of 2 ml/minute at 75° C. and at a pH value of 2.4 into a suspension, in 2,000 ml of water, of 100 g of the non-annealed pigment thus prepared, the pH value being kept constant by addition of 30% sodium hydroxide solution. After the mixture has been subsequently stirred for half an hour, the pigment is separated off, washed with water, dried at 120° C. and annealed at 800° C. for half an hour.

EXAMPLE 6

A solution of 26 g of $Ce(SO_4)_2.4H_2O$ in 420 ml of dilute sulfuric acid is metered at a rate of 2 ml/minute at 60° C. and at a pH value of 5.5 into a suspension, in 2,000 ml of water, of 100 g of a silver-white titanium dioxide/mica pigment in the rutile modification which has been prepared according to German Offenlegungsschrift 2,522,572 and has a particle size distribution of 10–60 μm, the pH value being kept constant by simultaneous dropwise addition of 25% sodium hydroxide solution. After the mixture has been subsequently stirred for half an hour, the pigment is separated off, washed with water, dried at 120° C. and annealed at 800° C. for half an hour.

EXAMPLE 7

A solution of 14 g of $SnCl_4.5H_2O$ in 280 ml of dilute hydrochloric acid is metered at a rate of 2 ml/minute at a temperature of 75° C. and at a pH value of 1.8 into a suspension, in 2,000 ml of water, of 100 g of a lilac-coloured rutile interference pigment (particle size 10–50 μm; 51% mica, 48% $TiO_2$, 1% $SnO_2$), the pH value being kept constant by simultaneous dropwise addition of 30% sodium hydroxide solution. After the mixture has been subsequently stirred for half an hour, the pigment is allowed to settle and is then separated off, washed with water, dried at 120° C. and annealed at 800° C. for half an hour.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A pearlescent pigment stable during preparation of glaze and enamel compositions containing the same, comprising mica flakes coated with at least one metal oxide layer and, in addition, a top layer, wherein the top layer is a mixture tin dioxide and cerium dioxide, in an amount of 10-30% by weight effective to stabilize the pigment to degradation from a coating of an enamel or a glaze.

2. A pearlescent pigment comprising mica flakes coated with at least one metal oxide layer and, in addition, a top layer of cerium dioxide, in an amount effective to stabilize the pigment to degradation from a coating of an enamel or a glaze.

3. A method of increasing the stability in enamel and glaze compositions of pearlescent pigments based on mica flakes coated with at least one metal oxide, comprising providing the pigments with an additional top coating which consists essentially of cerium dioxide.

4. A pigment of claim 2, wherein the weight of the top layer is 10-20% by weight of the total pigment.

5. A pigment of claim 2, weight of the weight of the top layer is 5-30% by weight of the total pigment.

* * * * *